(12) United States Patent
Rothenberg et al.

(10) Patent No.: US 7,123,634 B2
(45) Date of Patent: Oct. 17, 2006

(54) ZIG-ZAG LASER AMPLIFIER WITH POLARIZATION CONTROLLED REFLECTORS

(75) Inventors: Joshua E. Rothenberg, Los Angeles, CA (US); William H. Long, Jr., Torrance, CA (US); Gregory D. Goodno, Playa del Rey, CA (US); Paul T. Epp, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 327 days.

(21) Appl. No.: 10/841,588

(22) Filed: May 7, 2004

(65) Prior Publication Data

US 2005/0249258 A1 Nov. 10, 2005

(51) Int. Cl.
H01S 3/10 (2006.01)
H01S 3/13 (2006.01)
H01S 3/00 (2006.01)
H01S 3/06 (2006.01)
H01S 3/08 (2006.01)

(52) U.S. Cl. .......................... 372/27; 372/25; 372/106; 372/29.016; 372/29.02; 372/29.023; 372/33; 372/66; 359/337

(58) Field of Classification Search ................... 372/25, 372/27, 29.016, 29.02, 29.023, 33, 66, 106; 359/337
See application file for complete search history.

(56) References Cited

U.S. PATENT DOCUMENTS

| | | | |
|---|---|---|---|
| 4,943,782 A * | 7/1990 | Stephens et al. | 359/338 |
| 5,299,220 A | 3/1994 | Brown et al. | |
| 5,479,430 A * | 12/1995 | Shine, Jr. et al. | 372/66 |
| 5,640,480 A * | 6/1997 | Komine | 385/122 |
| 5,986,815 A | 11/1999 | Bryars | |
| 6,094,297 A | 7/2000 | Injeyan et al. | 359/345 |
| 6,219,360 B1 | 4/2001 | Komine et al. | 372/9 |
| 6,256,142 B1 * | 7/2001 | Injeyan et al. | 359/345 |
| 6,268,956 B1 * | 7/2001 | Injeyan et al. | 359/345 |
| 6,904,069 B1 * | 6/2005 | Honea et al. | 372/31 |
| 6,937,627 B1 * | 8/2005 | Lin | 372/6 |
| 2004/0156415 A1 * | 8/2004 | Palese et al. | 372/92 |
| 2005/0111496 A1 * | 5/2005 | Reeder et al. | 372/9 |

FOREIGN PATENT DOCUMENTS

EP 0 355 566 2/1990

OTHER PUBLICATIONS

Guido Klemz, et al., "Resonator with Doubled Stability Range Based on Birefringence Compensation . . . ," CLEO 2001, paper CThI2.*

(Continued)

*Primary Examiner*—Minsun Oh Harvey
*Assistant Examiner*—Hrayr A. Sayadian
(74) *Attorney, Agent, or Firm*—Tarolli, Sundheim Covell & Tummino LLP

(57) ABSTRACT

A solid state zig-zag slab laser amplifier in which depolarization occurring at total internal reflection from opposed lateral faces of the amplifier slab is controlled by selecting a complex evanescent coating that provides a selected phase retardance that results in minimization of depolarization. Without use of the complex coating, small changes in incidence angles can result in phase retardance changes large enough to increase depolarization significantly, especially when the amplifier is operated at higher powers. Appropriate selection of the complex evanescent coating allows a desired phase retardance angle to be maintained relatively constant over a small range of angles of incidence, at a given wavelength, and therefore permits minimization of depolarization and birefringence effects.

7 Claims, 6 Drawing Sheets

OTHER PUBLICATIONS

International Search Report for the corresponding PCT/US2005/012365, completed Jul. 7, 2005 by Officer E. Bésuelle of the European Patent Office.

J.H. Apfel: "*Graphical Method to Design Internal Reflection Phase Retarders*"; Applied Optics, vol. 23, No. 8, Apr. 15, 1984, pp. 1178-1183, XP009050252 cited in the application, *the whole document*.

* cited by examiner

US 7,123,634 B2

ZIG-ZAG LASER AMPLIFIER WITH POLARIZATION CONTROLLED REFLECTORS

BACKGROUND OF THE INVENTION

This invention relates generally to laser amplifiers and, more particularly, to end-pumped zig-zag solid state lasers. A zig-zag solid state laser includes an elongated slab of rare earth doped lasing material, such as yttrium-aluminum-garnet (YAG). An input beam generated by a master oscillator is launched into one end facet of the slab, at an angle selected to result in multiple internal reflections from the internal faces of the slab. A pump beam is also input at one end of the slab and amplification of the input beam takes place as the input beam is reflected back and forth along the slab. The doped region of the slab in which amplification takes place is cooled by external means.

The laser structure briefly described above is disclosed in detail in U.S. Pat. No. 6,094,297, referred to in this document as the Injeyan '297 patent, issued to Hagop Injeyan et al. and assigned to the same assignee as the present invention.

Although the amplifier described in the Injeyan '297 patent is efficient and produces a beam of good quality and polarization properties, improvement is called for when many such amplifiers are combined to produce higher power beams. For such a configuration, it is highly desirable that each amplifier output should have linear polarization. Linear polarization is also required by applications that utilize frequency conversion of the output. As this zig-zag slab architecture has been extended to higher powers, it has been found that the polarization properties of the amplified output can degrade significantly, such that linear polarization can no longer be maintained effectively.

Accordingly, there is a need for an improved zig-zag slab laser amplifier having significantly improved linear output polarization properties. The present invention is directed to this end.

SUMMARY OF THE INVENTION

The present invention resides in an optical amplifier comprising an elongated slab of a solid state lasing material having a predetermined cross-section defining opposing end faces, a plurality of lateral faces, a longitudinal axis defined between the opposing end faces generally parallel to the lateral faces; means for enabling pumped light to be directed along an axis generally parallel to the longitudinal axis; and one or more sources of pump beams. An input optical beam is repeatedly reflected between two opposed lateral faces as it progresses through and is amplified in the elongated slab. In accordance with the invention, the slab includes a complex evanescent coating disposed on the two opposed lateral faces, to reduce depolarization arising from birefringence accumulated upon propagation of a beam through the slab.

More specifically, the complex evanescent coating is selected to provide a selected phase retardance at each total internal reflection of the input optical beam as it zig-zags through the slab, the selected phase retardance resulting in minimization of the total accumulated depolarization. For example, the complex evanescent coating may be selected to provide a phase retardance of approximately zero at total internal reflection for the input optical beam. Ideally, the complex coating is selected to provide approximately the same selected phase retardance over a range of angles of incidence of the input optical beam with respect to the opposed lateral faces.

The amplifier may further comprise a polarization rotator, positioned to receive an amplified optical beam output from the elongated slab and to rotate the angle of polarization of the output beam; and optical means for reflecting the polarization-rotated output beam back into the elongated slab along a different path to provide a second amplification pass. As disclosed, in the optical amplifier of the invention the elongated slab of a solid state lasing material comprises two end sections of undoped solid state lasing material designed to limit absorption of pump light, and a central section of doped solid state lasing material diffusion bonded to the two end sections.

It will be appreciated from the foregoing that the present invention represents a significant advance in solid state laser amplifiers. Specifically, the use of a complex coating on opposed lateral faces of a zig-zag slab laser provides for polarization control and eliminates a serious drawback of optical amplifiers of this type when used at higher powers. Other aspects and advantages of the invention will become apparent from the following more detailed description, taken in conjunction with the accompanying drawings.

DETAILED DESCRIPTION OF THE INVENTION

Figure 1:
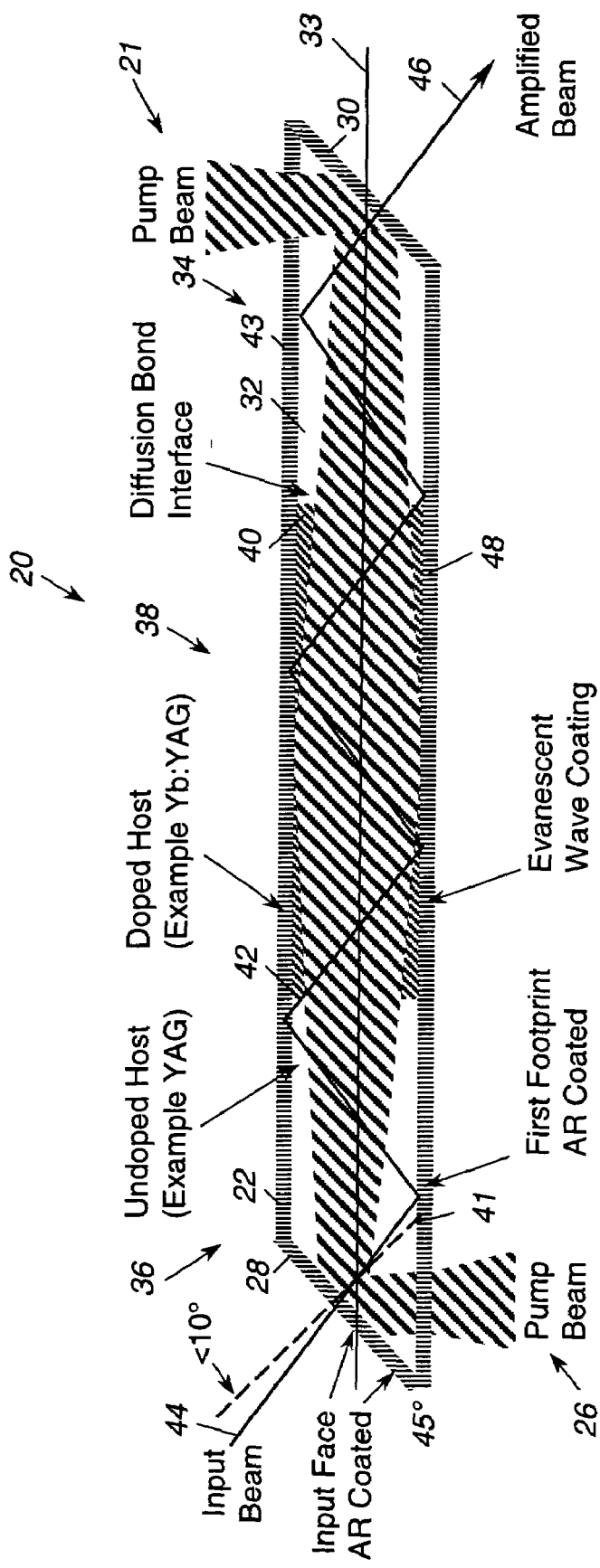
FIG. 1 is cross-sectional diagrammatic view of a solid state zig-zag laser of the prior art.

As shown in the drawings for purposes of illustration, the present invention is concerned with techniques for controlling polarization in a zig-zag slab laser amplifier. FIG. 1 is a cross-sectional view of a zig-zag slab laser amplifier of the prior art, as illustrated in U.S. Pat. No. 6,094,297, referred to in this document as the Injeyan '297 patent, which is hereby incorporated by reference into this document.

In the Injeyan '297 device, and in the present invention, an optical amplifier, generally identified by reference numeral 20, utilizes end pumping. With such a configuration, pumped light is generally co-aligned with amplified light along a longitudinal axis of a slab 22, resulting in a relatively long absorption length and providing relatively higher overall efficiencies. This configuration is particularly suitable for optical amplifiers that utilize solid state lasing material with relatively low absorption coefficients, such as those materials using ytterbium (Yb) and tellurium (Tm) as dopants. The absorption of the pumped light may be confined to a central region of the slab 22 to reduce heating at the opposing ends of the slab, which are known to be susceptible to warping.

The optical amplifier 20 includes the elongated slab 22 and a pair of pump beam sources 21 and 26. The elongated slab 22 is formed with a generally rectangular or square cross section defining a pair of opposing end faces 28 and 30 and four lateral faces 32. As used in this description, a longitudinal or lasing axis 33 is defined as an axis generally parallel to the lateral surfaces 32 between the opposing end faces 28 and 30. A major axis is defined as a horizontal axis in the direction of the zig-zag pattern, while a minor axis is defined to be a vertical axis generally perpendicular to the major axis. Both the major and minor axes are perpendicular to the longitudinal axis.

The slab 22 may be formed from a solid state lasing material with a relatively high index of refraction to cause internal reflection of the input beam in a generally zig-zag pattern as illustrated in FIG. 1, forming a so called zig-zag amplifier. Such zig-zag amplifiers are known to effect brightness scaling by allowing the input beam to average thermal gradients in the slab, effectively providing a homogeneous gain medium. In order to reduce heating of the ends of the slab 22, the slab 22 may be formed as a diffusion bonded composite material. More particularly, along the longitudinal axis 33 of the slab 22, the opposing end portions 34 and 36 of the slab 22 can be formed from undoped host materials, such as yttrium-aluminum-garnet (YAG). These end portions 34 and 36 can be diffusion bonded to a central portion 38 of the slab 22 formed from a doped host material, such as Yb doped YAG (Yb:YAG) forming two diffusion bond interfaces 40 and 42. Such diffusion bonding techniques are known in the art, for example, as described in detail in U.S. Pat. No. 5,441,803 hereby incorporated by reference. Such a configuration limits the absorption length to the center portion 38 of the slab 22. By limiting the absorption length to the center portion 38 of the slab 22, heat generated by optical pumping is mainly limited to the center portion 38 and away from the end portions 34 and 36, which are susceptible to warping. As mentioned above, the pump beams 21 and 26 are reflected through the slab 22 from the opposed end faces 30 and 28, respectively. The pump beams 21 and 26 may enter opposing lateral faces 32 of the slab 22 at opposing end portions 34 and 36, respectively, as generally shown in FIG. 1. In order to enable launching of pump beams into the slab 22, one or more footprints or windows 41 and 43 may be formed on opposing end portions 36 and 34, respectively. The windows 41 and 43 may be formed by way of a coating, such as an antireflection coating selected for the wavelength of the pump beams 21 and 26. As also shown in FIG. 1, the antireflection coating is disposed on the lateral face 32 as well as the opposing end faces 28 and 30, thereby reducing losses of both the input beam and the pump beams. The pump beams 21 and 26 are directed to opposing lateral faces 32 at opposing end portions 34 and 36 of the slab 22. The pump beams 21 and 26 are totally reflected from the opposing end faces 28 and 30 so that they are co-aligned with the longitudinal axis 33. By utilizing the composite slab 22 as discussed above, the absorption length of the slab 22 is limited to the central portion 38.

An input light beam 44 is directed to one end face 28 at a relatively small angle, for example, less than 10° relative to the normal (perpendicular) direction of the end face. By confining the angle of incidence of the input beam 44 and selecting a material having a relatively high index of refraction, the input light beam is totally reflected along the slab 22 in a generally zig-zag pattern as shown and is out coupled as an amplified beam 46 from the opposing end face 30. The zig-zag pattern across the slab temperature gradients combined with uniform pumping by the guided diode light and insulated slab edge results in relatively low thermal lensing with limited birefringence.

It is known in the art that pumping of the slab 22 results in increased temperature in the area where the pump light is absorbed. As mentioned above, pump beams, for example, from diode arrays, are directed generally perpendicular to the lateral faces 32 through the windows or footprints 41 and 43, and reflected from the opposing end faces 28 and 30 to cause the pump beams to be directed along the longitudinal axis 33. In order to cool the slab 22, various cooling methods can be used. Both conduction and convection cooling systems are suitable. An example of a conduction cooling system is to attach the slab 22 to a high intensity impingement cooler, for example, as manufactured by Thermal Electron in San Diego, Calif. or SDL, Inc. in San Jose Calif.

To minimize the thermal resistance between the slab 22 and the coolers, a thin layer of a thermally conductive material such as a soft metal, such as indium or gold, may be used. During assembly, the cooler/indium/slab assembly may be held under pressure at elevated temperatures, approximately 150° C. to flow the indium and eliminate contact resistance. For direct or convective cooling, the slab 22 may sealed in the dead zones with a thin layer of turbulent coolant flowing over the slab faces to remove heat as discussed in detail in U.S. Pat. No. 5,646,773, which is hereby incorporated by reference. An exemplary convection cooling system is disclosed for example, in commonly owned U.S. Pat. No. 5,646,773, which is also hereby incorporated by reference.

In the case of convection and conduction cooling, the lateral faces 32 of the slab 22 are coated with a dielectric material which serves as an evanescent wave coating 48 to preserve total internal reflection. As shown in FIG. 1, the evanescent wave coating 48 may extend from one end face 28, 30 to a region slightly beyond the diffusion bond interface 42, adjacent to the opposing end face. The evanescent wave coating 48 allows the slab 22 to be directly adhered to the impingement cooler. A thick layer (2–4 μm) of $MgF_2$ or $SiO_2$ may be used as the evanescent wave coating 48.

The coating 48 is a uniform film deposited on the slab surface and having an index of refraction lower than that of the slab material. The amplified beam's field decays exponentially in the evanescent coating 48 such that there is a negligible field present at the coating surface. Cooling applied to the coated surfaces of the slab 22 removes excess heat from the slab without impacting the optical performance. Temperature gradients that form within the slab can induce index non-uniformities and birefringence. However, the alternate transversals (zig-zags) of the beam tend to average out these effects and maintain both good beam quality and polarization purity. In particular, shear stress develops within the slab 22 and can lead to polarization rotation, but these polarization effects can be cancelled out by nearly identical adjacent traversals in opposite directions (zigs and zags) along the slab width, at least for low and moderate optical powers.

At high powers, it has recently been observed that devices of this general type can display severe depolarization. A further discovery is that the effect of total internal reflections (TIR) upon the polarization state of the propagating beam can play a very significant role in the amount of observed amplifier output polarization. The two polarization components of the amplified beam are the S-field, in the plane of the slab surface, and the P-field, in a plane perpendicular to the surface plane. These components experience a phase retardance upon total internal reflection, and the phase retardance can cause undesirable interference between the two polarizations as the amplified beam bounces back and forth down the slab, which can impede cancellation of the induced birefringence. In particular, it has been found that the polarization purity of the amplifier output could vary by a factor 5–10 times depending on the value of the TIR phase retardance. This phenomenon is illustrated in FIG. 2.

Figure 2:
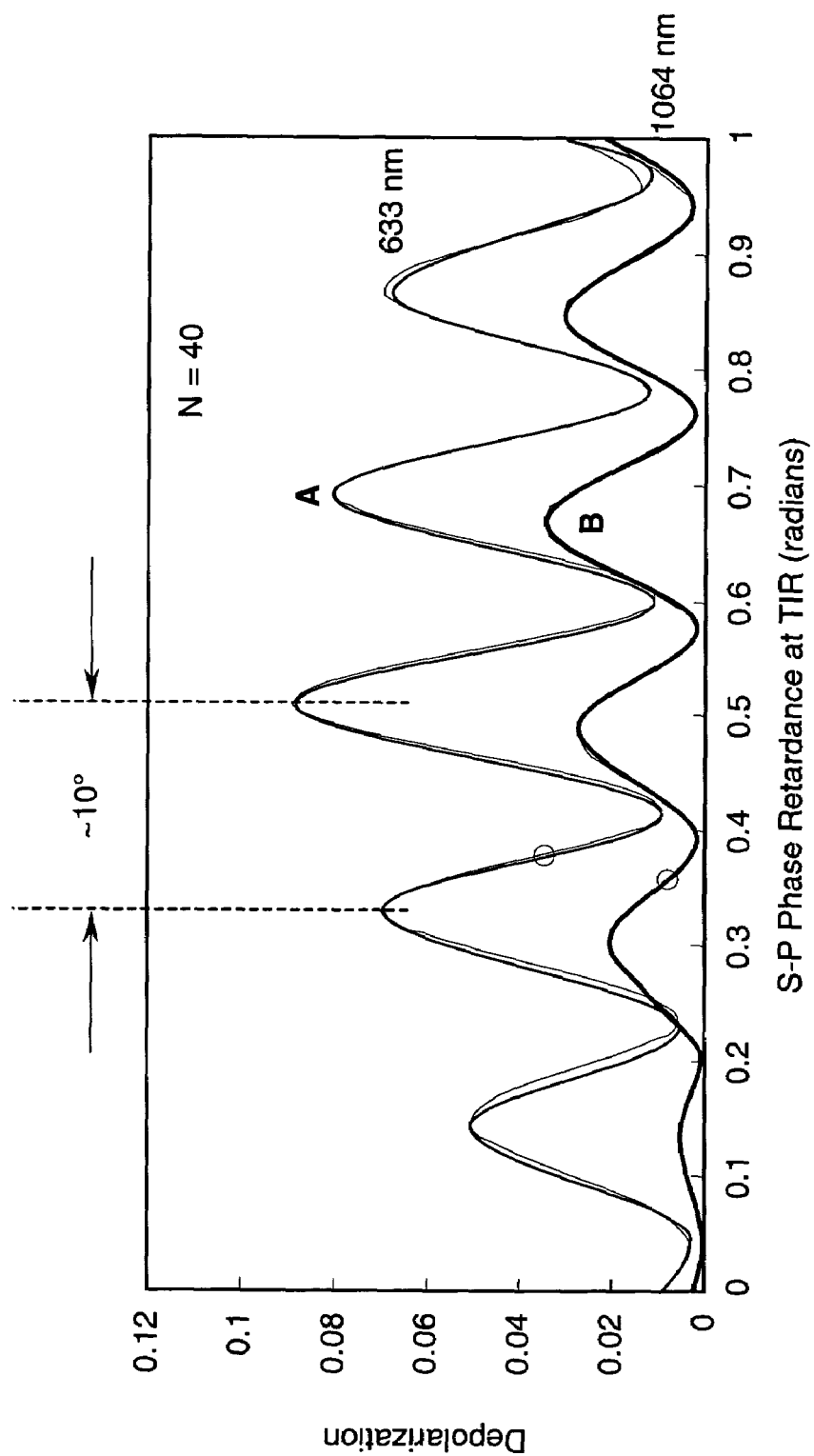
FIG. 2 is a graph showing variation of the total accumulated depolarization for a zig-zag slab versus total internal reflection (TIR) phase retardance.

FIG. 2 shows the variation of depolarization (plotted along the vertical axis) for a 2×20×125 mm zig-zag slab amplifier with 40 internal reflections (bounces), versus the TIR phase retardance, plotted along the horizontal axis and measured in radians. For each of the two wavelengths shown, 633 nm (curve A) and 1064 nm (curve B), there is a periodic variation in depolarization. Specifically, the figure shows a phase retardance spacing between depolarization maxima of approximately 10°. Therefore, the depolarization value can change from a minimum to a maximum value over a span of approximately only 5° of TIR phase retardance.

Figure 3:
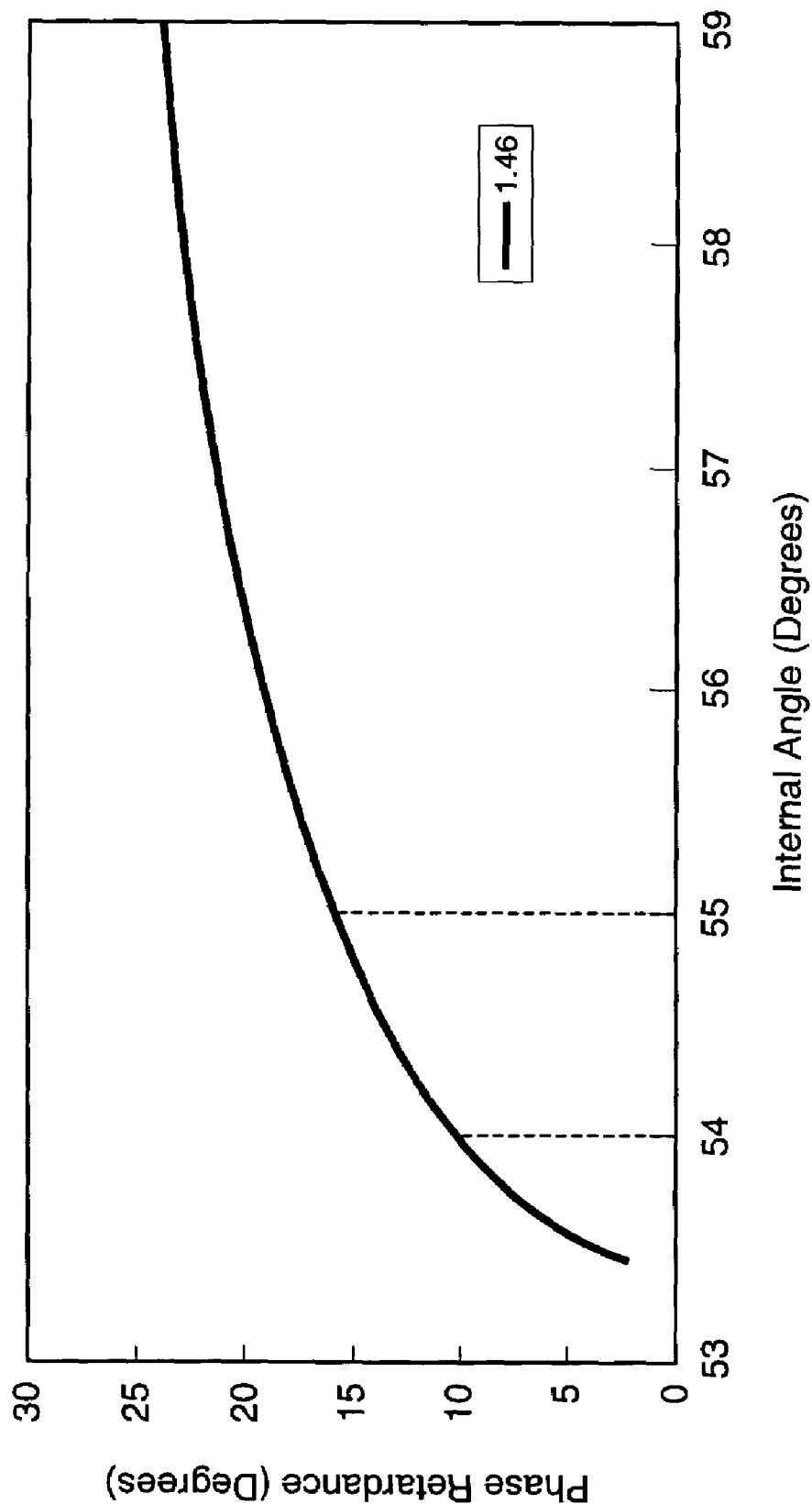
FIG. 3 is a graph showing variation of TIR phase retardance with internal angle of incidence, for a slab using a conventional thick silica evanescent coating.
Figure 4:
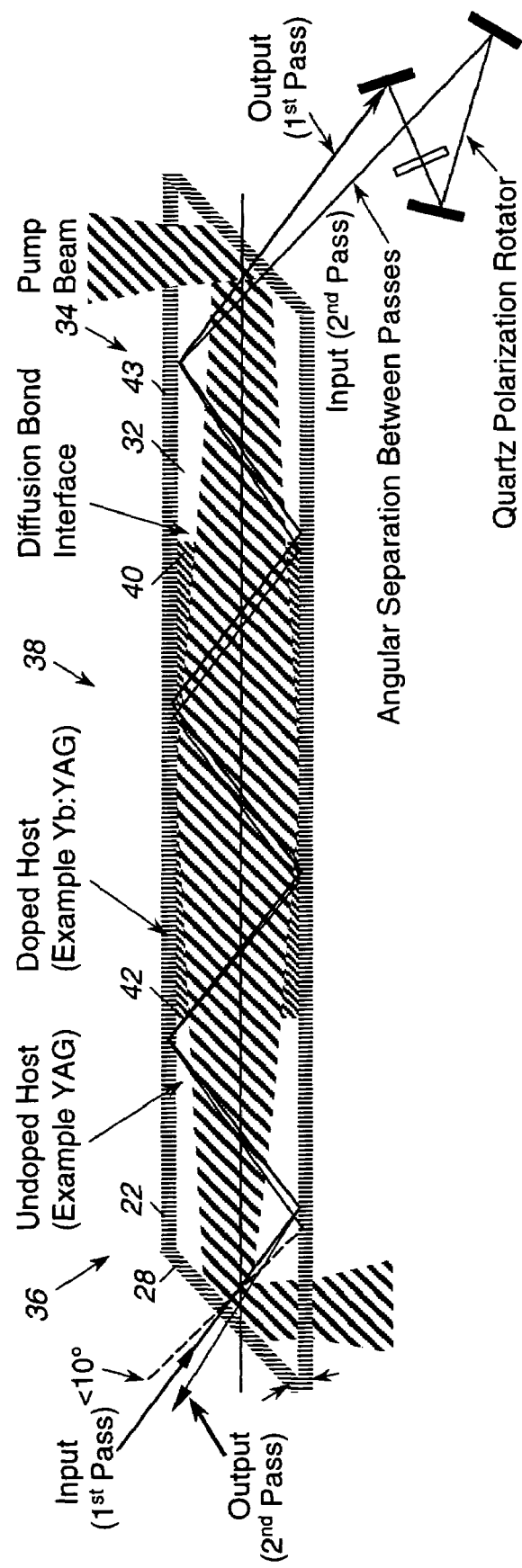
FIG. 4 is a view similar to FIG. 1, but showing a dual-pass architecture with a 90° polarization rotation and angular separation between first and second passes through the amplifier slab.

As shown in FIG. 3, for a slab with a conventional evanescent coating the TIR phase retardance can vary as much as 5° or more if the internal beam angle (the angle of incidence) changes by only 1° or less. For example, a change in internal angle from 54° to 55° results in a change in phase retardance from approximately 10° to more than 15°. A prior art amplifier technique involves the use of two passes through the slab 22, as shown in FIG. 4. The output beam from the first pass, indicated at 50, is reflected through a quartz polarization rotator 52 and then reflected back into the slab 22 as a second-pass input beam 54. In the second pass, traverses a slightly different path from the first-pass beam, and emerges from the end face 28 as an output beam 56. Implementation of this technique requires significant angular separation between the beams of the first and second passes. Clearly, if this angular separation results in a different internal angle, then, as discussed above with reference to FIG. 3, even a small change in internal angle can result in a change in a phase retardance of several degrees. Further, as seen from FIG. 2, this change in phase retardance can result in a significant depolarization effect.

Figure 5:
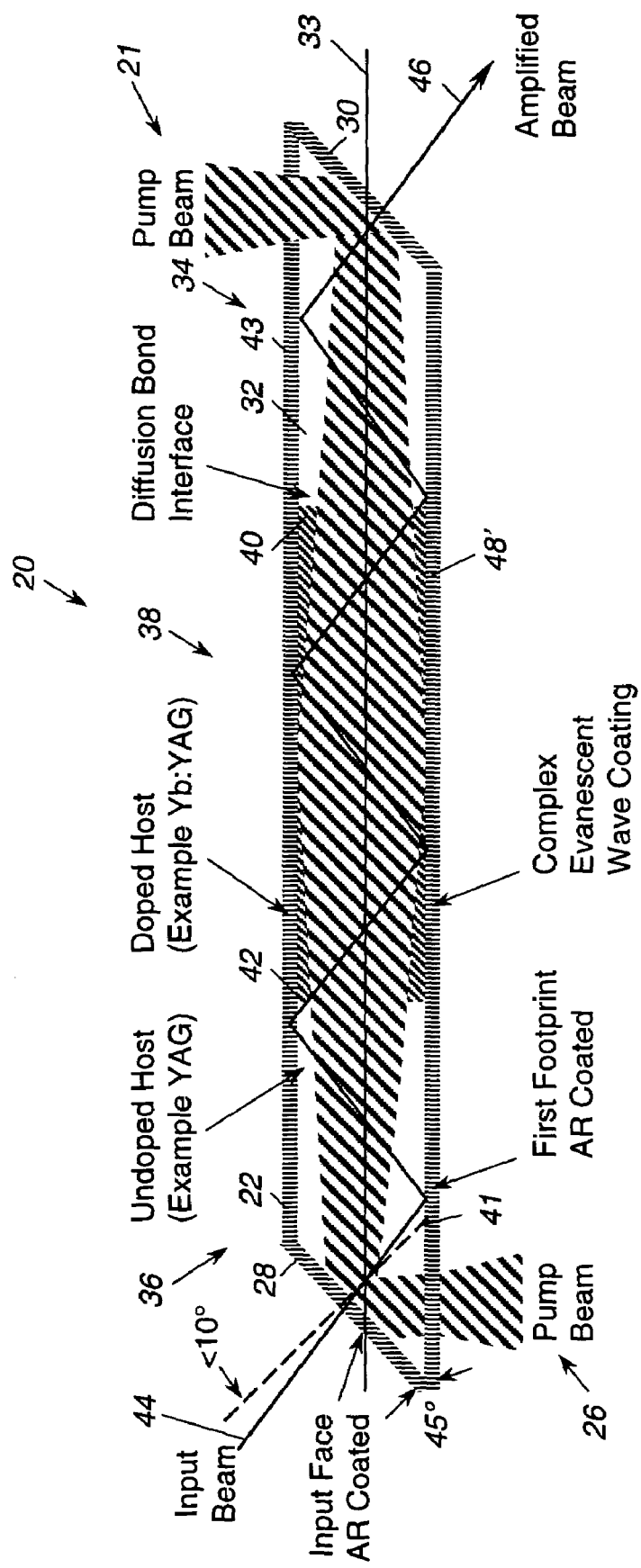
FIG. 5 is a view similar to FIG. 1, but including a complex evanescent coating in accordance with the present invention.

In accordance with the present invention, and as shown in FIG. 5, a complex evanescent coating 48' is included in the slab architecture, such that the TIR phase retardance has a specific value chosen advantageously to minimize the amplifier depolarization. For example, an S-P phase retardance near zero or near 0.23 radians (13°) results in minimum amplifier depolarization, as shown in FIG. 2.

Design of such complex coatings has been described in the past by, for example, J. H. Apfel in "Graphical method to design internal reflection phase retarders," Applied Optics, vol. 23, pages 1178–1183 (1984). For this particular application, a multi-layer coating with an overcoat of a thick silica (or other material) layer can be designed with great flexibility to achieve the desired phase shift, while ensuring that the field at the surface of the thick overcoat is negligible. In addition, since the amplified light does not penetrate the thick layer, an additional (multi-layer) coating may be added on top of the thick layer without adversely affecting the amplified light. These additional coating layers may be used to tailor the properties for incident angles smaller than the TIR critical angle, e.g., to provide high transmission of the pump light as it enters near the end of the slab 22 at near-normal incidence.

Furthermore, the design may be optimized such that the TIR phase retardance is nearly constant over a modest range of incident angles. This feature has two additional advantages. First, it allows more tolerance in the other elements of the slab design, such as small variations in the slab dimensions, and in the indices of refraction of both the slab and coating materials. Secondly, it allows the slab to be double-passed, as shown in FIG. 4, wherein the first pass output beam is returned back through the slab, after rotating the polarization 90° by an appropriate device such as a quartz crystal or a Faraday rotator. In order to separate this backward propagating second pass from the input beam, it may be required to launch it at a slightly different angle (and perhaps use a different number of bounces) from the first pass beam. If these two passes have nearly equal depolarization effects, then the dual pass combination with a 90° polarization rotation interposed can effectively cancel any residual depolarization present in a single pass. Designing the TIR coating 48' to be relatively insensitive to the incident angle enables the use of this enhanced dual pass architecture for depolarization reduction.

Figure 6:
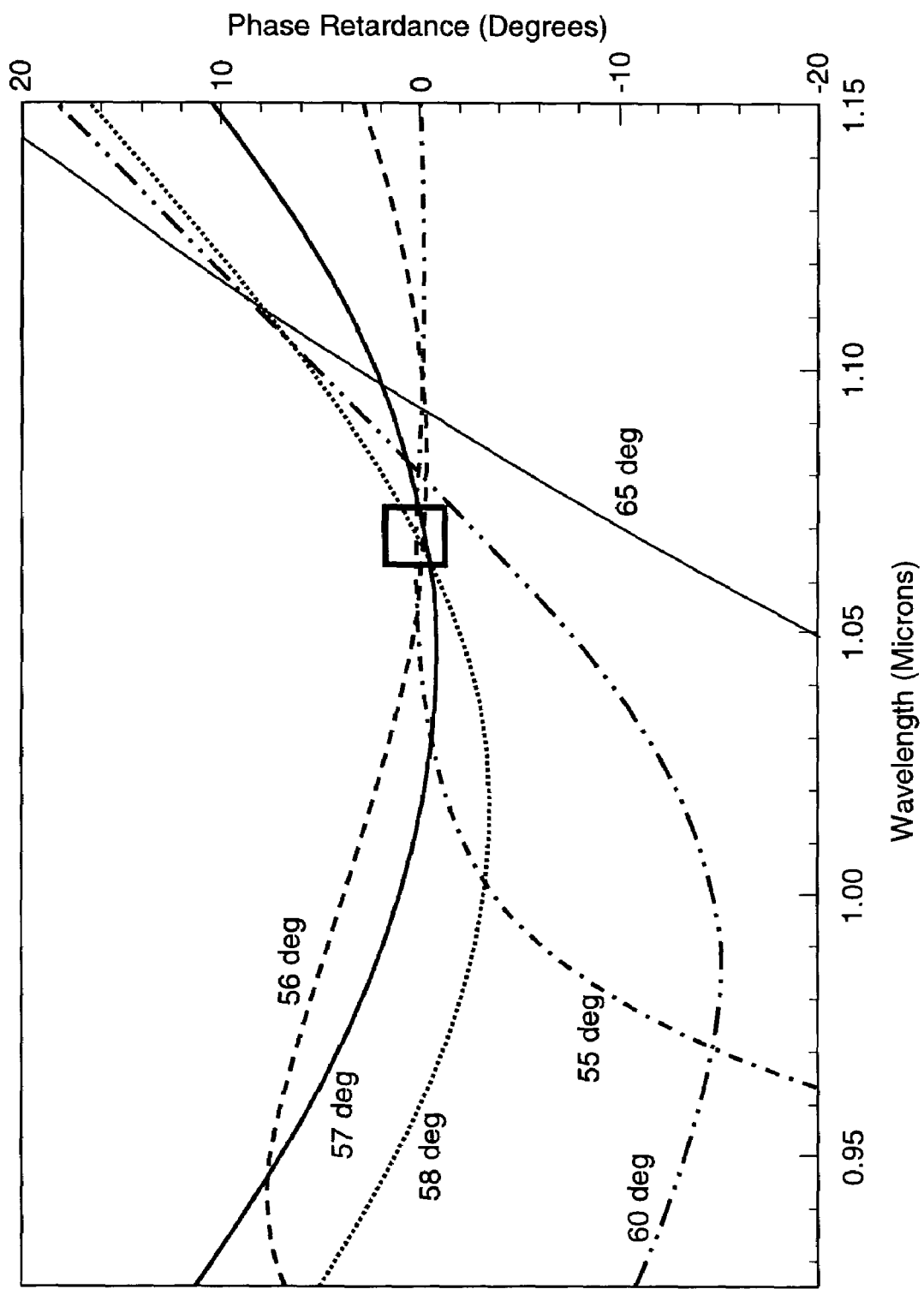
FIG. 6 is a graph showing phase retardance versus wavelength and angle of incidence, to indicate the relative constant magnitude of phase retardance over a small range of incident angles at a give wavelength, in accordance with the present invention.

An example of the performance of a multi-layer TIR coating designed for near-zero phase retardance over a small range of angles is shown in FIG. 6. At a wavelength of approximately 1.07 µm, the phase retardance is approximately zero over a range of incident angles from 55° to 58°, as indicated by the multiple curves in the region of the square 60. This range is adequate to accommodate two passes with an adjacent even number of bounces. For example, in a zig-zag slab design of interest (slab width of 2 mm and length of 125 mm, and nominally with 40 bounces), the difference between the internal angle of modes with consecutive even number of bounces is only approximately 1.3°. This multi-layer coating would allow two passes (using the architecture of FIG. 4) to propagate through the slab with up to about a 3° difference in internal angle while both passes experience near zero TIR phase retardance.

It will be appreciated from the foregoing that the present invention represents a significant advance in the field of high power solid-state lasers. In particular, the invention provides a technique for minimizing depolarization and resultant birefringence in a zig-zag slab laser. The invention may be usefully employed in scaled arrays of zig-zag laser amplifiers with higher power and beam quality. Such devices have both military and commercial applications, such as in directed energy weapon systems, remote sensing, and material processing. Any application requiring very high laser power would significantly benefit from the increased power that the invention provides in a slab laser structure. It will also be appreciated that, although a specific embodiment of the invention has been described for purposes of illustration, various modifications may be made without departing from the spirit and scope of the invention. Therefore, the invention should not be limited except as by the appended claims.

The invention claimed is:

1. An optical amplifier comprising:
an elongated slab of a solid state lasing material having a predetermined cross-section defining opposing end faces, a plurality of lateral faces, a longitudinal axis defined between the opposing end faces generally parallel to the lateral faces;
means for enabling pump light to be directed along an axis generally parallel to the longitudinal axis; and
one or more sources of pump beams;

wherein an input optical beam is repeatedly reflected between two opposed lateral faces as it progresses through and is amplified in the elongated slab;

and wherein the slab includes a complex evanescent coating disposed on the two opposed lateral faces, to reduce the accumulated depolarization of said input optical beam that has propagated through the slab.

2. An optical amplifier as defined in claim 1, wherein the complex evanescent coating is selected to provide a selected phase retardance at total internal reflection of the input optical beam, the selected phase retardance resulting in minimization of accumulated depolarization of said input optical beam that has propagated through the slab.

3. An optical amplifier as defined in claim 2, wherein the complex evanescent coating is selected to provide a phase retardance of approximately zero at total internal reflection for the input optical beam.

4. An optical amplifier as defined in claim 2, wherein the complex coating is selected to provide approximately the same selected phase retardance over a range of angles of incidence of the input optical beam with respect to the opposed lateral faces.

5. An optical amplifier as defined in claim 4, wherein the complex evanescent coating is selected to provide a phase retardance of approximately zero at total internal reflection for the input optical beam.

6. An optical amplifier as defined in claim 4, and further comprising:

a polarization rotator, positioned to receive an amplified optical beam output from the elongated slab and to rotate the angle of polarization of the output beam; and optical means for reflecting the polarization-rotated output beam back into the elongated slab along a different path to provide a second amplification pass.

7. An optical amplifier as defined in claim 1, wherein the elongated slab of a solid state lasing material comprises two end sections of undoped solid state lasing material designed to limit absorption of pump light, and a central section of doped solid state lasing material bonded to the two end sections; and the complex evanescent coating is selected to provide a selected phase retardance to minimize the total depolarization of the input optical beam arising from sum of the birefringent effects of temperature or strain gradients attributable to the presence of the end sections.

* * * * *